United States Patent [19]

Fischer

[11] Patent Number: 4,921,383
[45] Date of Patent: May 1, 1990

[54] PLASTIC EXPANSIBLE PLUG

[75] Inventor: Artur Fischer, Tumlingen, Fed. Rep. of Germany

[73] Assignee: Fischerwerke Artur Fischer GmbH & Co. KG, Waldachtal/Tumlingen, Fed. Rep. of Germany

[21] Appl. No.: 353,071

[22] Filed: May 15, 1989

[30] Foreign Application Priority Data

Jun. 1, 1988 [DE] Fed. Rep. of Germany ....... 3818652

[51] Int. Cl.$^5$ ............................................. F16B 13/06
[52] U.S. Cl. ....................................... 411/57; 411/72
[58] Field of Search ..................... 411/72, 71, 60, 44, 411/57, 54, 45 S, 29, 30, 31, 32, 33

[56] References Cited

U.S. PATENT DOCUMENTS 777,399  12/1904  Church .............................. 411/72 X

FOREIGN PATENT DOCUMENTS 6603502  4/1965  Fed. Rep. of Germany .
1500671  4/1972  Fed. Rep. of Germany .

Primary Examiner—Rodney M. Lindsey
Attorney, Agent, or Firm—Michael J. Striker

[57] ABSTRACT

An expansible plug made of a plastic material located in a drilled hole in masonry for receiving a fastening screw and comprising expansible legs having at the expansible end thereof outer notches of a reduced depth.

4 Claims, 1 Drawing Sheet

U.S. Patent    May 1, 1990    4,921,383
Fig.1 PRIOR ART
Fig.2
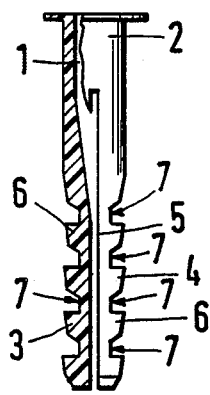
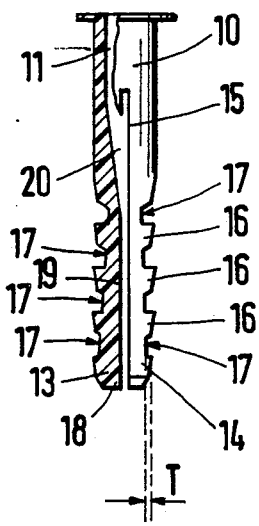
Fig.3
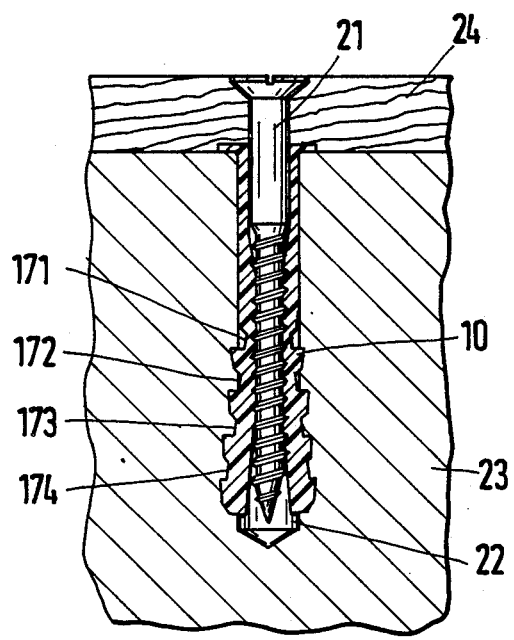

PLASTIC EXPANSIBLE PLUG

BACKGROUND OF THE INVENTION

The invention relates to a plastic expansible plug. Expansible plugs made of a plastic material and which are used for inserting into a drilled hole in masonry for receiving a fastening screw are known. As the fastening screw is screwed in, expansible legs formed on the expansible plug, and which extend into the drilled hole, are caused to spread apart. The expansion pressure ensures a firm anchoring of the plug together with the securings screw. The known expansible plugs have on the exterior of their expansible legs notches and teeth arranged alternately in succession. As the fastening screw is pressed into the expansible plug, it presses the teeth against the wall of the drilled hole, and the notches between the teeth are partially filled up with the plastic material as a result of deformation of the material. This is caused by the securing screw pushing the plastic material outwards in the region of the notches from the inside as it is being screwed in. Tests have shown that, because of the ability of the plastic material to yield in the region of the notches, the fastening screw can be screwed in more easily, but particularly high holding values often cannot be achieved.

SUMMARY OF THE INVENTION

The object of the invention is to develop an expansible plug of the type mentioned at the beginning and having relatively high holding values because of greater compression of the expansible plug in the drilled hole.

This object is achieved by providing an expansible plug of the type mentioned at the beginning and in which the depth of the notches located at the expansible end of the plug is less than the depth of other notches. A reduction in the notch depth, especially that of the notches located at the expansible end of the expansible plug, means that no, or only very slight, material deformation caused by the expansion pressure originating upon insertion of the fastening screw can occur there. As a result of the reduction in the notch depth, the thickness of the plastic material is increased, and thus in this region a relatively high expansion pressure is produced. Since the maximum expansion pressure which results from the provision, according to the invention, of notches of reduced depth at the plug expansible end does not occur until the fastening screw has been screwed in fully, the fastening screw can be screwed in without difficulty. In addition to an increase in the expansion force and the more secure fastening associated with it, better guiding of the screw and improved security against rotation are achieved.

It is especially advantageous for the notches arranged in succession in the expansible leg to be of different depths at least over a portion of the legs, the notch depth decreasing continuously towards the expansible end. This measure causes the expansion force to correspondingly continuously increase when the fastening screw is being screwed in, until the maximum holding value is achieved when the screw is fully screwed in.

Furthermore, the bore provided for receiving the fastening screw is tapered with its apex being located in the region of the notches of reduced depth. This results in very good guiding of the securing screw when the fastening screw is screwed in. This guiding continues into the region of the increased expansion force, which, as described above, increases in the region of the notches of reduced depth in the expansible plug.

The present invention as to its construction so to its mode of operation, together with additional objects and advantages thereof, will be best understood from the following description of the preferred embodiments with reference to the accompanying drawings.

BRIEF DESCRIPTION OF THE DRAWING

FIG. 1 shows a longitudinal partially cross-sectional view of an expansible plug of the prior art;

FIG. 2 shows a longitudinal partially cross-sectional view of an expansible plug according to the invention having notches of decreasing depth; and FIG. 3 shows a longitudinal cross-sectional view of the expansible plug of FIG. 2 inserted in a drilled hole with a fastening screw being screwed into it.

DESCRIPTION OF THE PREFERRED EMBODIMENT

The expansible plug shown in FIG. 1 has a bore 1, into which a securing screw can be screwed. The sleeve-like shaft 2 divides into two expansible legs 3, 4 facing each other and separated by a longitudinal slot 5. Teeth 6, between which notches 7 are formed, project at the exterior of the expansible legs 3, 4. The notches 7 are all of uniform depth as is customary for such expansible plugs of the prior art.

FIG. 2 shows an expansible plug according to the invention in which notches 17 the depth of which decreases towards the expansible end 18, are formed between teeth 16. The notch 17 which is most adjacent to the expansible end 18, has the smallest depth T.

Moreover, the expansible plug 10 according to the invention has a tapering bore 11, the apex 19 of which lies in the region of the expansible legs 13, 14, where notches 17 of reduced depth are located. Thus each of the facing inner surfaces of the two expansible legs 13, 14 formed by the slot 15, has a groove 20 tapering towards the apex 19.

FIG. 3 shows the expansible plug 10 according to the invention located in a drilled hole 22 in masonry 23 with a fastening screw 21 being inserted thereinto. The fastening screw 21 secures a lath 24 to the masonry 23. Especially in the region of the notches 171 and 172, the plastic material has been deformed outwardly by the pressure exerted by the fastening screw 21. However, in the area of notch 173 and especially in the area of notch 174, there is only slight material deformation, as the material thickness in this region is considerably greater than in the region of the notches 171 and 172. Thereby at the end 18, powerful expansion and a correspondingly powerful clamping effect are achieved.

While the invention has been illustrated and described as embodied in a plastic expansible plug for receiving a fastening screw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An expansible plug made of a plastic or similar material to be inserted into a drilled hole in masonry for receiving a fastening screw, said expansible plug comprising a tapered bore for receiving the fastening screw; expansible legs having an expansible end portion; and alternate teeth and notches on outer surfaces of said expansible legs, said notches including first notches located at said expansible end portion of said expansible plug and having a first depth, and second notches located on a remaining portion of said expansible legs and having a second depth, the first depth of said first notches being smaller than the second depth of said other notches to increase the thickness of the material at the expansible end portion of the expansible plug and to increase expansion pressure in the drilled hole in the vicinity of the end portion.

2. An expansible plug according to claim 1, further comprising a longitudinal slot extending between said expansible legs.

3. An expansible plug according to claim 2, wherein said expansible end portion has an expansible end, the depth of successive notches continuously decreasing towards said expansible end at least over a portion of a total length of said expansible legs.

4. An expansible plug according to claim 2, wherein said tapering bore has an apex located in a region of said expansible legs which contains the first notches.

* * * * *